(12) United States Patent
Da Costa et al.

(10) Patent No.: US 9,919,629 B2
(45) Date of Patent: Mar. 20, 2018

(54) ASSEMBLY FOR A SEAT FRAME, SEAT FRAME AND METHOD FOR MANUFACTURING SUCH AN ASSEMBLY

(71) Applicant: Faurecia Sièges d'Automobile, Nanterre (FR)

(72) Inventors: Augusto Da Costa, Etrechy (FR); Joël Canteleux, Gallardon (FR); Sébastien Seille, Neuilly su Seine (FR); Philippe Ducreuzot, Nogent-sur-Vernisson (FR)

(73) Assignee: Faurecia Sièges d'Automobile, Nanterre (FR)

( * ) Notice: Subject to any disclaimer, the term of this patent is extended or adjusted under 35 U.S.C. 154(b) by 50 days.

(21) Appl. No.: 14/917,929

(22) PCT Filed: Aug. 14, 2014

(86) PCT No.: PCT/FR2014/052092
§ 371 (c)(1),
(2) Date: Mar. 9, 2016

(87) PCT Pub. No.: WO2015/033039
PCT Pub. Date: Mar. 12, 2015

(65) Prior Publication Data
US 2016/0214517 A1  Jul. 28, 2016

(30) Foreign Application Priority Data
Sep. 9, 2013  (FR) ...................... 13 58648

(51) Int. Cl.
*A47C 7/02*  (2006.01)
*B60N 2/68*  (2006.01)
(Continued)

(52) U.S. Cl.
CPC ............. *B60N 2/68* (2013.01); *B60N 2/1615* (2013.01); *B60N 2/4811* (2013.01);
(Continued)

(58) Field of Classification Search
CPC ........ B60N 2/68; B60N 2/4885; B60N 2/682; B60N 2/1615; B60N 2/72;
(Continued)

(56) References Cited

U.S. PATENT DOCUMENTS

| | | | | |
|---|---|---|---|---|
| 5,884,968 A | * | 3/1999 | Massara ................... | B60N 2/23 297/216.12 |
| 6,276,754 B1 | * | 8/2001 | Youssef-Agha ......... | B60N 2/28 24/682.1 |

(Continued)

FOREIGN PATENT DOCUMENTS

| CN | 102666198 A | 9/2012 |
|---|---|---|
| EP | 2027951 A1 | 2/2009 |

(Continued)

OTHER PUBLICATIONS

Chinese Office Action in Chinese with English summary for CN application No. 201480060272.9, dated Mar. 30, 2017, 8 pages.
(Continued)

*Primary Examiner* — Chi Q Nguyen
(74) *Attorney, Agent, or Firm* — Reising Ethington P.C.

(57) ABSTRACT

The present invention relates to an assembly (21), particularly for a seat frame (7), comprising a structural tube (15) and at least one frame wire (20) mounted on the structural tube (15). The frame wire is mounted on the structural tube (15) by metal forming without the addition of external material. The present invention also relates to a seat frame (7), particularly for a backrest or a seat portion of a vehicle seat, comprising a left side flank (10) and/or a right side flank (11). The seat frame comprises at least one structural tube (15) mounted to the left side flank (10) and/or to the right side flank (11) by metal forming without the addition of external material.

12 Claims, 4 Drawing Sheets

(51) Int. Cl.
*B60N 2/48* (2006.01)
*B60N 2/72* (2006.01)
*B60N 2/16* (2006.01)

(52) U.S. Cl.
CPC ......... *B60N 2/4879* (2013.01); *B60N 2/4885* (2013.01); *B60N 2/682* (2013.01); *B60N 2/72* (2013.01); *B60N 2002/4894* (2013.01)

(58) Field of Classification Search
CPC .......... B60N 2002/4894; B60N 2/4897; B60N 2/42745; B60N 2/4228; B60N 2/4256; B60N 2/4207; B60N 2/4221; B60N 2/427
USPC ..... 297/391, 399, 401, 404, 216.14, 452.45, 297/216.1, 216.12, 216.13, 216.18, 452.1, 297/452.18
See application file for complete search history.

(56) References Cited

U.S. PATENT DOCUMENTS

| | | | | |
|---|---|---|---|---|
| 6,361,115 | B1* | 3/2002 | Aufrere | B60N 2/2821 297/216.11 |
| 6,824,212 | B2* | 11/2004 | Malsch | B60N 2/4228 297/216.12 |
| 6,983,526 | B2* | 1/2006 | Duffy | B60N 2/286 24/265 CD |
| 7,077,472 | B2* | 7/2006 | Steffens, Jr. | B60N 2/42781 297/216.12 |
| 7,721,406 | B2 | 5/2010 | McCay | |
| 8,539,661 | B2 | 9/2013 | Gross et al. | |
| 8,833,857 | B2* | 9/2014 | Hara | B60N 2/68 297/344.1 |
| 8,919,886 | B2 | 12/2014 | Saveski et al. | |
| 2009/0108646 | A1 | 4/2009 | Chida et al. | |
| 2009/0134683 | A1* | 5/2009 | Furukawa | B60N 2/206 297/391 |
| 2010/0066135 | A1* | 3/2010 | Humer | B60N 2/66 297/216.12 |
| 2012/0241584 | A1 | 9/2012 | McLeod et al. | |
| 2013/0341484 | A1* | 12/2013 | Yamada | B60N 2/682 248/636 |
| 2016/0214517 | A1* | 7/2016 | Da Costa | B60N 2/4885 |

FOREIGN PATENT DOCUMENTS

| | | |
|---|---|---|
| EP | 2492139 A1 | 8/2012 |
| FR | 2082625 A5 | 12/1971 |
| FR | 2861660 A1 | 5/2005 |
| KR | 20100119663 A | 11/2010 |
| WO | WO2005069985 A2 | 8/2005 |
| WO | WO2009056294 A1 | 5/2009 |

OTHER PUBLICATIONS

International Search Report in French with partial English translation for International application No. PCT/FR2014/052092, dated Mar. 13, 2015, 10 pages.

English translation of Written Opinion for International application No. PCT/FR2014/052092, dated Mar. 13, 2015, 12 pages.

* cited by examiner

ASSEMBLY FOR A SEAT FRAME, SEAT FRAME AND METHOD FOR MANUFACTURING SUCH AN ASSEMBLY

FIELD OF THE DISCLOSURE

The present invention relates to assemblies for a seat frame, to frames for a seat, particularly a seat for an automobile, to methods for manufacturing such an assembly and to vehicle seats comprising such a frame.

More specifically, the invention relates to an assembly for a seat frame comprising a structural tube and a frame wire mounted on the structural tube.

BACKGROUND OF THE DISCLOSURE

A seat portion frame or a backrest frame of a vehicle seat usually comprises several structural tubes connecting the side flanks.

Assemblies for seat frames comprising a structural tube and a frame wire mounted on the structural tube in which the frame wire is welded to the structural tube are known. However, in order to lighten the seat frame, being able to use materials such as aluminum for the structural tubes is desirable, while the frame wires should be made of a material of sufficient strength to be able to fulfill their function, for example steel. The impossibility of welding such metals requires the use of additional connecting parts that weigh the structure down, increase its cost and complicate its manufacturing method.

OBJECTS AND SUMMARY OF THE DISCLOSURE

An object of the present invention is to mitigate some of the aforementioned disadvantages.

For this purpose, the present invention relates to an assembly, particularly for a seat frame, comprising a structural tube and at least one frame wire mounted on the structural tube. According to at least some embodiments of the present invention, the frame wire is mounted on the structural tube by metal forming without the addition of external material.

As a result of this construction, it is possible to use, for the structural tube and the frame wire, different materials that are difficult to weld to one another. Such an assembly does not require additional connecting parts between the frame wire and the structural tube. The manufacturing method is reliable and reproducible.

In various embodiments of the present invention, one may possibly also have recourse to one and/or the other of the following arrangements:

the structural tube comprises at least one axial abutment, preventing the frame wire from moving in translation in relation to the structural tube, so as to connect and mount the frame wire to the structural tube quickly and economically by metal forming;
the structural tube extending along a transverse axis, the frame wire comprises a longitudinal portion extending along a longitudinal axis substantially perpendicular to the transverse axis;
the frame wire comprises a loop-shaped portion connected to the longitudinal portion;
the loop-shaped portion comprises an inner surface substantially conforming to at least one part of a receiving surface of the structural tube;
the structural tube comprises two axial abutments disposed on both sides of the receiving surface of the structural tube;
the inner surface comprises at least one rib able to cooperate with at least one complementary groove arranged on the receiving surface of the structural tube, so as to lock the transverse rotation of the frame wire in relation to the structural tube in predetermined angular positions while enabling a user to pivot between the angular positions.

Another object of the invention is a seat frame, particularly for a backrest or a seat portion of a vehicle seat, comprising a left side flank and/or a right side flank. According to at least some embodiments of the present invention, the seat frame comprises at least one structural tube mounted to the left side flank and/or to the right side flank by metal forming without the addition of external material.

In various preferred embodiments of the present invention, one may possibly also have recourse to one and/or the other of the following arrangements:

the frame also comprises at least one assembly as described above;
the frame wire of the assembly is mounted to the left side flank and/or to the right side flank by metal forming without the addition of external material, so as to form, for example, a support for a seat nose for a vehicle seat and/or a support for a layer arranged in the seat portion;
the frame wire of the assembly comprises a mating portion able to be connected to a headrest, preferentially able to be removably received in at least one headrest recess so as to fix the headrest onto the vehicle seat;
the mating portion of the frame wire comprises at least one notch able to ensure locking in translation, cooperating with at least one lock tab of the headrest; so as to removably connect the headrest to the vehicle seat and to enable the height of the headrest to be adjusted;
the assembly comprises a securing plate integral with the frame wire and substantially arranged opposite of the mating portion of the frame wire in relation to the structural tube of the assembly, so as to enable passive prevention of the risk of whiplash injuries in the event of a vehicle accident.

Another object of the invention is a seat, particularly for an automobile, comprising a seat frame as described above.

A further object of the invention is a method for manufacturing a seat frame comprising the steps consisting of:
providing a left side flank and/or a right side flank,
providing a structural tube and/or an assembly as described above,
mounting the structural tube and/or the assembly to the left side flank and/or to the side flank by metal forming without the addition of external material.

Of course, the different characteristics, variations and/or embodiments of the present invention can be combined with each other according to various combinations to the extent that they are not incompatible or mutually exclusive of the other.

BRIEF DESCRIPTION OF THE DRAWINGS

The present invention will be better understood and other characteristics and advantages will appear again upon reading the following detailed description comprising embodiments given for illustrative purposes with reference to the appended figures, presented by way of non-limiting examples, that can be used to supplement the understanding of the present invention and the presentation of its implementation and, where appropriate, contribute to its definition, in which.

It should be noted that, in the figures, the structural and/or functional elements common to the various embodiments may present the same references. Thus, unless otherwise specified, such elements have identical structural, dimensional and material properties.

In the interests of clarity, only elements useful for understanding the embodiments described have been represented and will be explained.

DETAILED DESCRIPTION OF THE DISCLOSURE

In the following description, when reference is made to absolute position qualifiers, such as the terms "before," "behind," "top," "bottom," "left," "right," etc., or relative position qualifiers, such as the terms "above," "below," "superior," "inferior," etc., or to orientation qualifiers, reference is made to a seat in a normal position of use in the ordinary direction in which the vehicle progresses.

Figure 1:
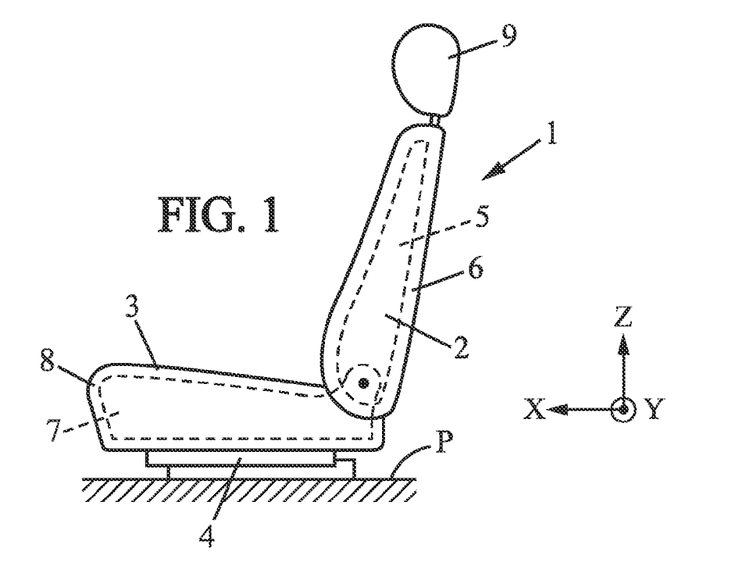
FIG. 1 is a schematic view of a vehicle seat according to the present invention.

FIG. 1 represents a schematic view of a seat 1 of an automobile according to an embodiment of the present invention comprising a backrest 2 and a seat portion 3 on which the backrest 2 may, for example, be mounted. Seat portion 3 may be fitted on a floor P of the automobile chassis through one or more slides 4, for example two side slides.

Backrest 2 comprises a backrest frame 5, preferentially rigid, on which a backrest cover 6 is mounted. Seat portion 3 comprises a seat portion frame 7, preferentially rigid, on which a seat portion cover 8 is mounted. Backrest frame 5 is mounted on seat portion frame 7, through at least one articulation around a transverse axis Y, so as to be able to adjust the inclination of backrest 2 in relation to seat portion 3.

Backrest frame 5 and seat portion frame 7 are respectively a seat frame 5, 7 in the sense of the present invention.

Optionally, as presented in FIG. 1, seat 1 also comprises a headrest 9 mounted on an upper part of backrest 2, opposite seat portion 3, in relation to backrest 2.

Figure 2:
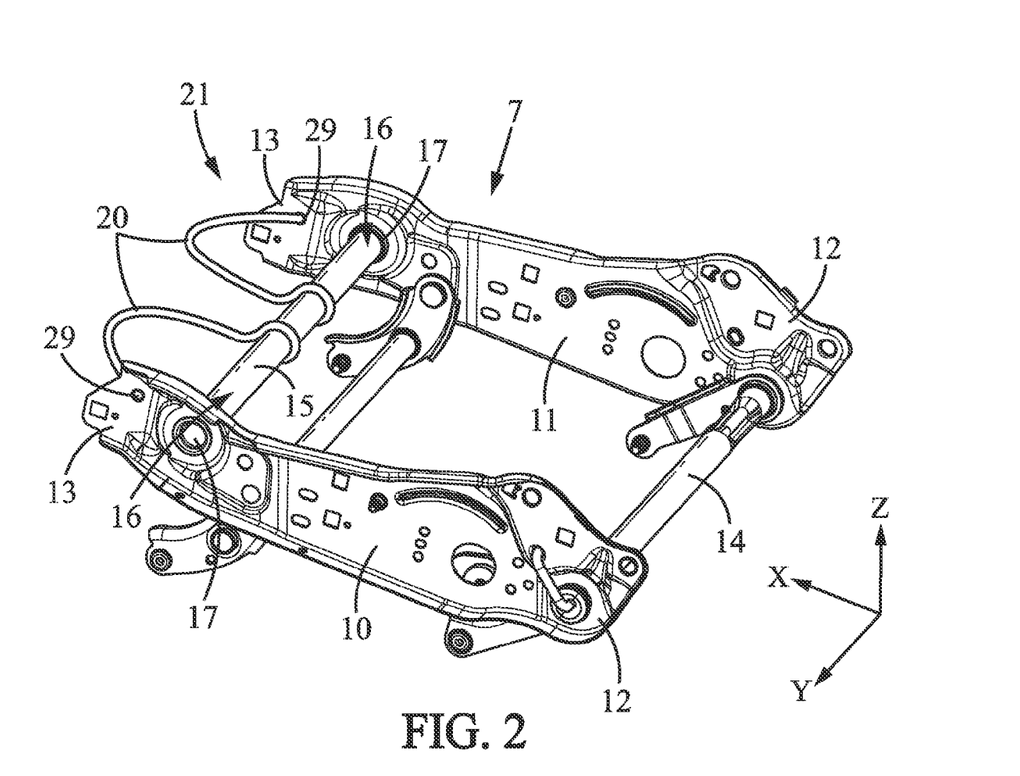
FIG. 2 is a schematic view of a frame for a seat portion of a vehicle seat according to the present invention.
Figure 3:
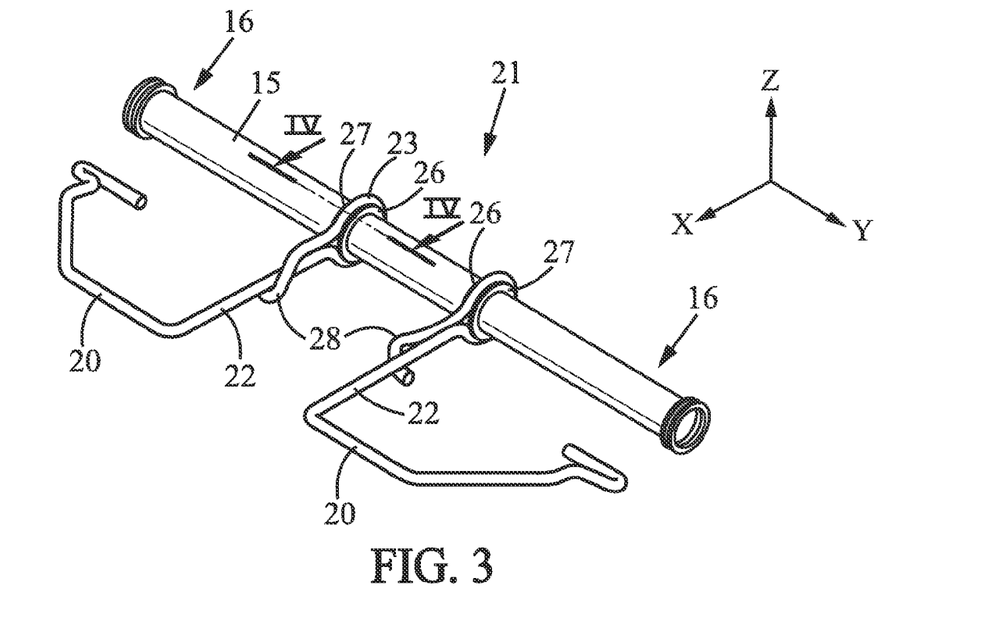
FIG. 3 is a detailed schematic view of an assembly for the frame for a seat portion of a vehicle seat from FIG. 2.
Figure 4:
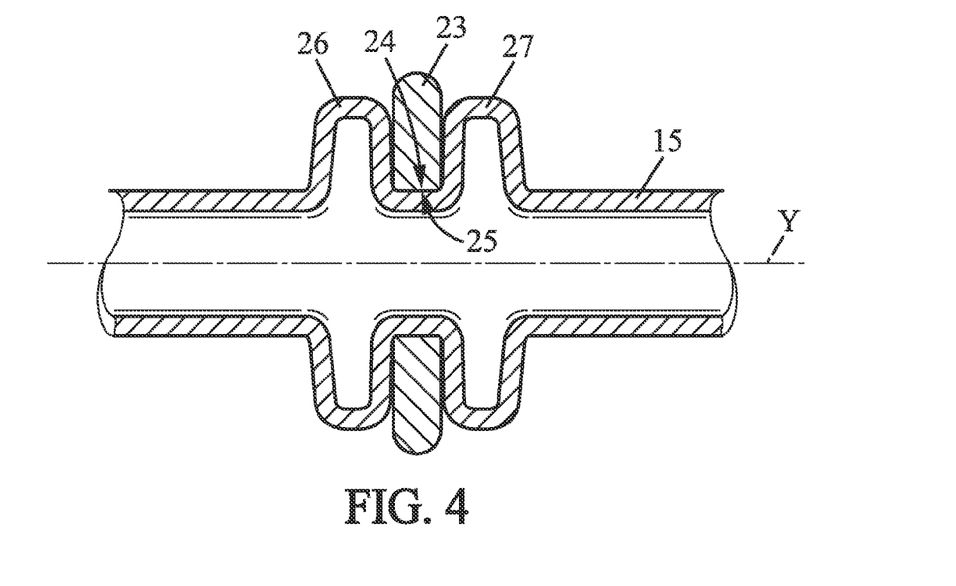
FIG. 4 is a detailed cross-sectional view of the assembly along axis IV-IV from FIG. 3.

FIGS. 2 to 4 are, respectively, a schematic view of a seat portion frame 7, a detailed schematic view of an assembly 21 for a seat portion frame 7 from FIG. 2 and a detailed cross-sectional view of assembly 21 along axis IV-IV from FIG. 3.

According to a first embodiment of the invention, illustrated in FIGS. 2 to 4, seat portion frame 7 comprises a left side flank 10 and a right side flank 11.

Left side flank 10 and right side flank 11 respectively extend along a longitudinal axis X from a first end 12 to a second end 13. More specifically, as presented in FIG. 2, the first end 12 is disposed behind seat portion 7 and the second end 13 is disposed in front of seat portion 7.

Left side flank 10 and right side flank 11 are interconnected by at least one structural tube 14, 15, preferentially cylindrical and disposed at ends 12, 13. Advantageously, left side flank 10 and right side flank 11 are interconnected by a first structural tube 14 and a second structural tube 15, preferentially cylindrical, respectively arranged at the first ends 12 of the left side flank 10 and the right side flank 11, for the first structural tube 14, and at the second ends 13 of the left side flank 10 and the right side flank 11, for the second structural tube 15.

The first structural tube 14 and the second structural tube 15 are respectively a structural tube 14, 15 of seat portion frame 7 in the sense of the present invention.

Other structural tubes can also connect the left side flank 10 and the right side flank 11 in other locations, in addition to and/or instead of the first structural tube 14 and/or the second structural tube 15. In particular, an additional structural tube, in addition to the first structural tube 14 and the second structural tube 15, enables the fold resistance of the structure to be strengthened. Also, such an additional structural tube also enables additional functions to be provided.

The first structural tube 14 and the second structural tube 15 are, advantageously, disposed substantially perpendicular to the left side flank 10 and the right side flank 11. Thus arranged, the first structural tube 14 and the second structural tube 15 extend along the transverse axis Y, the longitudinal axis X and the transverse axis Y being perpendicular to one another.

The left side flank 10, respectively the right side flank 11, may comprise any end plates, flanges, connecting rods, structure plates, frame components, etc. The term "flank" will thus include any formed part, in particular any pierced part, on which the structural tube 14, 15, in particular the first structural tube 14 and/or the second structural tube 15, can be mounted.

Left side flank 10, respectively right side flank 11, may typically be metallic. Alternatively, it may also be a part made from a high mechanical performance plastic material, or else a fiberglass based part or a carbon fiber based part.

The thickness of the left side flank 10, respectively the right side flank 11, may be thin in the case of a metal part, in particular between 0.5 mm and 3 mm. However, the thickness of the left side flank 10, respectively the right side flank 11, could be thicker in the case of a plastic part without being excluded from the scope of the present invention.

Preferentially, particularly for a weight gain and to respond to the weight reduction matter, the first structural tube 14, respectively the second structural tube 15, is made of metal, particularly aluminum, or of a light alloy.

The first structural tube 14, respectively the second structural tube 15, is connected and mounted to the left side flank 10, respectively to the right side flank 11, by metal forming, particularly by cold metal forming, i.e., without the addition of external material, as detailed below.

Thus, the first structural tube 14, respectively the second structural tube 15, is advantageously made of an alloy or a metal presenting sufficient ductility to be able to undergo cold forming operations.

As seen in FIGS. 2 and 3, according to a particular example of embodiment, the first structural tube 14, respectively the second structural tube 15, thus comprises at least one end portion 16. Advantageously, the end portion 16 presents, at least in the vicinity of an assembly area of the first structural tube 14, respectively the second structural tube 15, on the left side flank 10, respectively the right side flank 11, a cylindrical axisymmetric form, and preferably presents a circular cross-section. In this way the structural tube 14, 15 ensures good rigidity of the seat portion frame 7 and enables an inexpensive and simple method for manufacturing and/or mounting the seat portion to be used.

By way of example, the first structural tube 14, respectively the second structural tube 15, presents an outer diameter of between 10 mm and 31 mm, particularly between 21 mm or 26 mm. In addition, advantageously, the first structural tube 14, respectively the second structural tube 15, presents a thickness of between 0.8 mm to 3 mm.

End portion 16 is received in an opening 17 made in the left side flank 10, respectively the right side flank 11. Preferentially, opening 17 is a circular bore to be able to enable easy connection and mounting to structural tube 14, 15, particularly in an embodiment in which the structural tube 14, 15 presents a cylindrical axisymmetric form.

A metal forming method enabling the structural tube 14, 15 to be connected and mounted to the left side flank 10 and/or to the right side flank 11 may for example be described as follows.

Here the metal forming method enabling the structural tube 14, 15 to be connected and mounted to the left side flank 10 and/or to the right side flank 11 is described.

The metal forming method enabling the first structural tube 14, respectively the second structural tube 15 to be connected and mounted to the left side flank 10 and/or the right side flank 11 may comprise radial expansion deformation of the end portion 16 of the first structural tube 14, respectively the second structural tube 15.

In addition, the radial contact of opening 17 with the end portion 16 prevents the first structural tube 14, respectively the second structural tube 15, from deforming at this level. Consequently, side flank 10 is sandwiched between deformations at the location of the end portion 16 of the first structural tube 14, respectively the second structural tube 15.

Also, an anti-rotation indentation may be provided thanks to one or more notches arranged at the level of opening 17.

The seat portion frame 7 may also comprise at least one frame wire 20. Preferentially, frame wire 20 is mounted on one of the structural tubes 14, 15 of the seat portion 7. According to the example of embodiment presented in FIGS. 2, 3 and 4, the frame wire 20 is mounted on the second structural tube 15.

Advantageously, frame wire 20 is mounted on structural tube 14, 15 of seat portion frame 7 by metal forming, particularly by cold metal forming, i.e., without the addition of external material.

Structural tube 14, 15 and frame wire 20 form assembly 21 for seat portion frame 7. In particular, assembly 21 makes a cover support for a seat nose of seat 1.

For example, assembly 21 makes a support for seat portion cover 8 of seat 1. In addition, assembly 21 may also make a support for a layer arranged in seat portion 3.

Advantageously, frame wire 20 is made of a material distinct from a material constituting the first structural tube 14, respectively the second structural tube 15, on which it is mounted. By way of example, frame wire 20 is made of steel wire, particularly thick steel wire, and structural tube 14, 15 is made of aluminum or a light alloy.

With such material choices, it is therefore difficult to make an assembly by welding the frame wire 20 on the structural tube 14, 15.

As illustrated in FIGS. 3 and 4, assembly 21 is such that frame wire 20 is mounted on the second structural tube 15 by metal forming, particularly by cold metal forming, i.e., without the addition of external material as explained below.

According to the example of embodiment illustrated in FIGS. 2 and 3, assembly 21 for seat portion frame 7 comprises two frame wires 20 in a general "L" shape, mounted on the structural tube 15 in two spaced apart points along the Y transverse axis.

More specifically, frame wire 20 is shaped so as to comprise a longitudinal portion 22 extending along the X longitudinal axis, i.e., substantially perpendicular to the second structural tube 15 that extends along the Y transverse axis. In addition, the frame wire 20 comprises a loop-shaped portion 23, connected to the longitudinal portion 22.

The loop-shaped portion 23 comprises an inner surface 24 substantially conforming to a part of receiving surface 25 of structural tube 15. Advantageously, the inner surface 24 of the loop-shaped portion 23 at least partially, and preferentially completely or nearly completely, envelopes the receiving surface 25 of structural tube 15. Thus arranged, the loop-shaped portion 23 is wound around a complete circumference of structural tube 15 or around a portion, preferentially a significant portion, of a circumference of structural tube 15. In this way, displacement of the frame wire 20 in relation to structural tube 15 is prevented, or at least limited, in the directions in space perpendicular to the direction of the structural tube 15, i.e., in the directions in space perpendicular to the Y transverse axis.

Structural tube 15 thus comprises a number of receiving surfaces 25 equal to the number of frame wires 20 of assembly 21.

In addition, structural tube 15 comprises at least one inner axial abutment 26 and/or at least one outer axial abutment 27. Preferentially, structural tube 15 comprises an equal number of inner axial abutments 26 and outer axial abutments 27. Preferentially, the number of inner axial abutments 26 and outer axial abutments 27 is equal to the number of frame wires 20 of assembly 21.

The inner axial abutment 26 and the outer axial abutment 27 are respectively an axial abutment 26, 27 in the sense of the present invention.

Preferentially, and as illustrated in further detail in FIGS. 3 and 4, structural tube 15 comprises an inner axial abutment 26 and an outer axial abutment 27 arranged on both sides of the receiving surface 25 of structural tube 15.

Inner axial abutment 26 and/or outer axial abutment 27 are advantageously in contact with the loop-shaped portion 23, so as to immobilize the loop-shaped portion 23 in translation in relation to structural tube 15 along the Y transverse axis.

In a variation of embodiment, as illustrated in FIG. 3, frame wire 20 may also comprise at least one reinforcing portion 28, preferentially connected to the loop-shaped portion 23. Reinforcing portion 28 advantageously extends parallel to the longitudinal portion 22, along the X longitudinal axis. In addition, reinforcing portion 28 is advantageously in contact with longitudinal portion 22.

More specifically, reinforcing portion 28 and longitudinal portion 22 are advantageously formed, particularly by metal forming, to be wound around each other, so as to securely hold frame wire 20 on structural tube 15.

Thus, in the example from FIG. 3, reinforcing portion 28 is wound, along the longitudinal direction X, around the longitudinal portion 22 of frame wire 20.

In particular, inner axial abutment 26, respectively outer axial abutment 27, may be bulb-shaped and arranged on structural tube 15, particularly by localized deformation of structural tube 15 on both sides of loop-shaped portion 23.

Thus, in one embodiment, the method for manufacturing assembly 21 comprises, starting from structural tube 14, 15 in metal, particularly in aluminum, or in a light alloy, at least:
- one step of making the inner axial abutment 26,
- one step of inserting, along the Y transverse axis, the loop-shaped portion 23 of frame wire 20 on structural tube 14, 15,
- one step of abutting the loop-shaped portion 23 against the inner axial abutment 26, and
- one step of making the outer axial abutment 27.

According to an alternative embodiment, the method for manufacturing assembly 21 comprises, starting from structural tube 14, 15 in metal, particularly in aluminum, or in a light alloy, at least:
- one step of placing, along the Y transverse axis, the loop-shaped portion 23 of frame wire 20 on structural tube 14, 15
- one step of making the inner axial abutment 26, in contact with the loop-shaped portion 23 of the frame wire 20, and
- one step of making the outer axial abutment 27, in contact with the loop-shaped portion 23 of the frame wire 20.

At the insertion or placement step, the loop-shaped portion 23 of frame wire 20 was formed during a prior bending step.

Alternatively, the insertion or placement step may be replaced by the bending step to obtain the loop-shaped portion 23 of frame wire 20 wound around the complete circumference of structural tube 14, 15 or over a portion, preferentially a significant portion, of the circumference of structural tube 14, 15.

The method for manufacturing assembly 21 may also comprise a step of fixing the frame wire 20 by winding the reinforcing portion 28 around the longitudinal portion 22 of the frame wire 20.

The frame wire 20 fixing step is advantageously carried out prior to the step of making the inner axial abutment 26 and/or the step of making the outer axial abutment 27.

Still alternatively, it is possible to form the inner axial abutment 26 and the outer axial abutment 27 before positioning the frame wire 20. In such a case, loop-shaped portion 23 may be formed by deformation respectively around the receiving surface 25 of structural tube 15 and between the inner axial abutment 26 and the outer axial abutment 27. In fact, in such an arrangement, structural tube 15, with the inner axial abutment 26 and the outer axial abutment 27, then presents a general groove shape disposed between the inner axial abutment 26 and the outer axial abutment 27.

According to this particular alternative embodiment of the method for manufacturing assembly 21, the frame wire 20 fixing step is advantageously carried out after the step of making the inner axial abutment 26 and/or the step of making the outer axial abutment 27.

Indentations on the inner surface 24 of the loop-shaped portion 23 may also be provided.

The indentations are adapted to cooperate with the receiving surface 25, preferentially with the counter-indentations of receiving surface 25, in order to prevent rotation around the Y transverse axis of the frame wire 20 on the structural tube 14, 15. Thus, the indentations ensure a rotation locking role.

Alternatively or additionally, axial depressions may be made on the inner axial abutment 26 and/or the outer axial abutment 27, in order to prevent rotation, around the Y transverse axis, of the frame wire 20 around the structural tube 14, 15 axis.

The indentations or axial depressions may, for example, be made by using the method described in document FR-A-2-942-431.

Frame wire 20 of assembly 21 is also fixed to the left side flank 10, respectively to the right side flank 11, preferentially at the level of the second end 13 of the left side flank 10, respectively the side flank 11.

Frame wire 20 of assembly 21 is also advantageously fixed to the left side flank 10, respectively the right side flank 11, by metal forming.

Frame wire 20 may be fixed to the left side flank 10, respectively the right side flank 11, by metal forming, particularly by cold metal forming, i.e., without the addition of external material.

In particular, frame wire 20 may be fixed to the left side flank 10, respectively to the right side flank 11, by localized deformation in an opening 29 made for this purpose in the left side flank 10, respectively in the right side flank 11.

In a variation, the free end of frame wire 20 may be formed to be able to be fitted into opening 29 made for this purpose in the left side flank 10, respectively in the right side flank 11.

Figure 5:
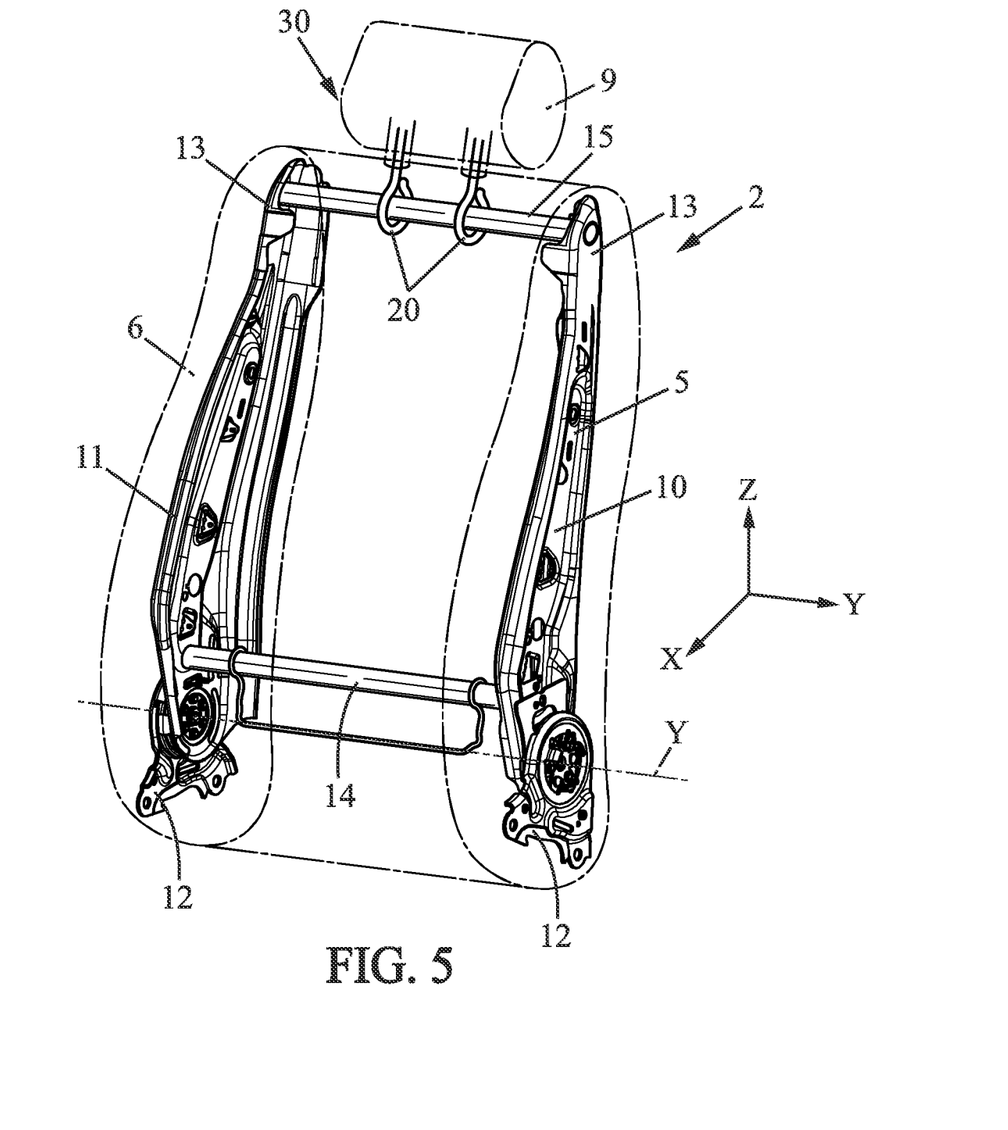
FIG. 5 is a schematic view of a frame for a seat portion of a vehicle seat according to the present invention.
Figure 6:
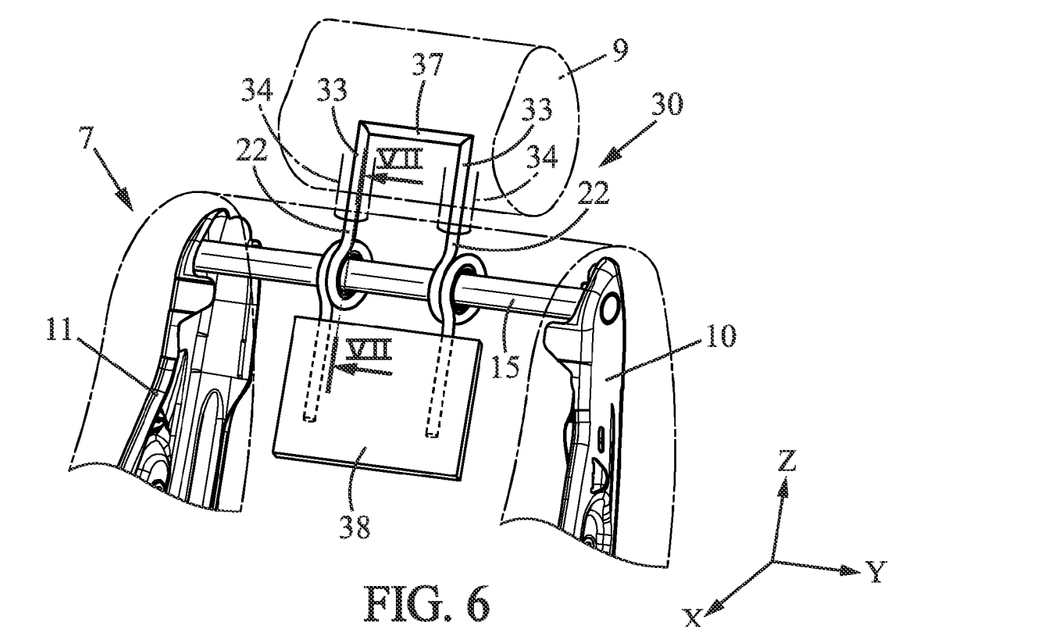
FIG. 6 is a detailed schematic view of an assembly for the frame for a seat portion of a vehicle seat from FIG. 5.
Figure 7:
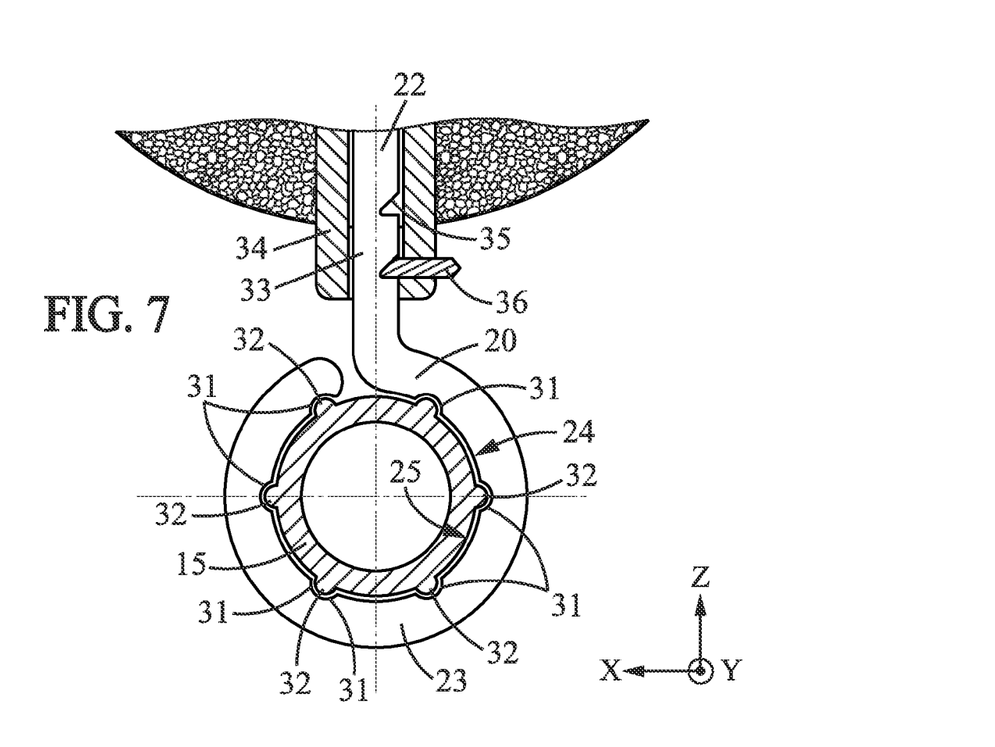
FIG. 7 is a detailed cross-sectional view of the assembly along axis VII-VII from FIG. 6.

FIGS. 5 to 7 are, respectively, a schematic view of a backrest frame 5, a detailed schematic view of an assembly 30 for a backrest frame 5 from FIG. 5 and a detailed cross-sectional view of assembly 30 along axis VII-VII from FIG. 6.

FIGS. 5 to 7 illustrate a second embodiment specific to the backrest frame 5 according to the present invention.

Backrest frame 5 is structurally similar to the seat portion frame 7 described previously. In fact, the backrest frame 5 comprises a left side flank 10 and a right side flank 11, each extending respectively along a Z vertical axis, from a first end 12 to a second end 13. More specifically, as presented in FIG. 5, the first ends 12 of the left side flank 10 and of the right side flank 11 are disposed at the bottom of backrest 5 while the second ends 13 of the left side flank 10 and of the right side flank 11 are disposed at the top of backrest 5.

Similarly to the seat portion frame 7, the left side flank 10 and right side flank 11 of the backrest frame 5 are interconnected by at least one structural tube 14, 15, preferentially cylindrical, advantageously by a first structural tube 14 and a second structural tube 15, each extending along a Y transverse axis and connecting the left side flank 10 and the right side flank 11, particularly at the level of the first ends 12 for the first structural tube 14 and at the level of the second ends 13 for the second structural tube 15.

The first structural tube 14 and the second structural tube 15 are respectively a structural tube 14, 15 of backrest frame 5 in the sense of the present invention.

Other structural tubes can also connect the left side flank 10 and the right side flank 11 in other locations, in addition to and/or instead of the first structural tube 14 and/or the second structural tube 15. In particular, an additional structural tube, in addition to the first structural tube 14 and the second structural tube 15, enables the fold resistance of the structure to be strengthened. Also, such an additional structural tube also enables additional functions to be provided.

The first structural tube 14 and the second structural tube 15 are, advantageously, disposed substantially perpendicular to the left side flank 10 and the right side flank 11. Thus arranged, the first structural tube 14 and the second structural tube 15 thus extend along the transverse axis Y.

The different structural elements, notably structural tube 14, 15, particularly the first structural tube 14, the second structural tube 15, the left side flank 10, the right side flank 11, etc., present the same characteristics and specifics as those applied to seat portion frame 7 or backrest frame 5.

The metal forming method enabling the structural tube 14, 15 to be connected and mounted to left side flank 10 and to right side flank 11 of backrest frame 5 is identical to the metal forming method described previously in relation to seat portion frame 7.

Lastly, the backrest frame 5 may also comprise at least one frame wire 20. Preferentially, frame wire 20 is mounted on the structural tube 14, 15 of the backrest frame 5. According to the example of embodiment presented in FIGS. 5, 6 and 7, the frame wire 20 is mounted on the second structural tube 15.

Advantageously, frame wire 20 is mounted on structural tube 14, 15 of backrest frame 5 by metal forming, particularly by cold metal forming, i.e., without the addition of external material.

Structural tube 14, 15 and frame wire 20 form assembly 30 for the backrest frame 5. In particular, assembly 30 makes an attachment assembly on which a headrest 9 can be mounted.

For example, assembly 30 makes a support for a backrest cover 6 of seat 1. In addition, assembly 30 may also make a support for a layer arranged in backrest 2.

Advantageously, frame wire 20 is made of a material distinct from a material constituting the structural tube 14, respectively the structural tube 15, on which it is mounted. By way of example, frame wire 20 is made of steel wire, particularly thick steel wire, and structural tube 14, 15 is made of aluminum or a light alloy.

Frame wires 20 comprise part or all of the characteristics detailed previously in relation to seat portion frame 7, so will not be described again.

In addition, in the example from FIG. 7, inner surface 24 of the loop-shaped portion 23 may comprise at least one rib 31. Rib 31 is able to cooperate with at least one complementary groove 32 arranged on the receiving surface 25 of the second structural tube 15. Preferentially, the inner surface 24 of the loop-shaped portion 23 comprises a plurality of ribs 31 cooperating with a plurality of complementary grooves 32.

Cooperation between rib 31 and complementary groove 32 is, in particular, able to lock the frame wire 20 in rotation around the Y transverse axis, in relation to the second structural tube 15. Nevertheless, in a particularly advantageous manner, the locking in rotation of the frame wire 20 around the Y transverse axis, in relation to the second structural tube 15, is done in predetermined angular positions. In addition, it is also desirable that the locking in rotation of the frame wire 20 enables the user to pivot between the angular positions by hand.

In a variation of embodiment, only the frame wire 20 comprises ribs 31 and only the receiving surface 25 of the second structural tube 15 comprises complementary grooves 32. According to another alternative embodiment, frame wire 20 and receiving surface 25 of the second structural tube 15 comprise ribs 31 and complementary grooves 32.

Frame wire 20 of assembly 30 may also comprise at least one mating portion 33 able to be connected to headrest 9.

As seen in FIG. 7, mating portion 33 of frame wire 20 of assembly 30 is also able to be removably received in at least one recess 34 of headrest 9.

Mating portion 33 may also comprise at least one notch 35, able to lock the headrest 9 in rotation along the Z vertical axis. For this purpose, notch 35 is able to cooperate with at least one lock tab 36 of headrest 9.

The longitudinal portion 22 of frame wire 20 may advantageously include part or all of the mating portion 33. Notch 35 can thus be disposed on the longitudinal portion 22 of frame wire 20, so as to enable displacement of the headrest 9 in relation to the backrest of seat 1 along the Z vertical axis.

In this way, it is possible to removably connect the headrest 9 to the seat 1 and to enable the height of the headrest 9 to be adjusted.

According to the example of embodiment of assembly 30 for the backrest frame 5 making a headrest fixation assembly illustrated in FIG. 6, assembly 30 comprises a single frame wire 20 in a general "U" shape, mounted on the structural tube 15 in two spaced apart points along the Y transverse axis.

Frame wire 20 includes, in a single piece, the characteristics and specifics of two frame wires 20 described above and may, in particular, comprise two loop-shaped portions 23 and two longitudinal portions 22. In such an arrangement, the two longitudinal portions 22 are connected by a transverse portion 37.

It is thus possible to connect and mount frame wire 20 to structural tube 15 at the level of two loop-shaped portions 23, to ensure its immobilization in rotation and in translation in relation to structural tube 15.

In addition, as seen in FIG. 6, assembly 30 for backrest frame 5 may also comprise a securing plate 38 to enable passive prevention of the risk of whiplash injuries in the event of a vehicle accident.

Securing plate 38 is integral with frame wire 20. It may be made of plastic or of metal, particularly a light metal to reduce the weight of assembly 30.

When the securing plate 38 is made of plastic, it may, for example, be fixed to the frame wire 20 by overmolding, by clipping or by fitting onto the frame wire 20.

Securing plate 38 is substantially arranged opposite from mating portions 33 of frame wire 30 in relation to the structural tube 15 of assembly 30, along the Z vertical axis, i.e., substantially opposite the headrest 9 in relation to structural tube 15.

In this way, when the back of a user seated on seat 1 exerts pressure on the securing plate 38, for example during an accident, securing plate 38 exerts a moment on the frame wire 20 tending to cause it to pivot around structural tube 15, i.e., around the Y transverse axis, to cause the headrest 9 to advance in the direction of the user, substantially along the X longitudinal axis. This enables the risk of whiplash injuries to be prevented.

The left side flank 10, the right side flank 11, the structural tube 14, 15, the frame wire 20, etc., are respectively structural parts of the backrest frame 5 and/or the seat portion frame 7.

Of course, the invention is not limited to the embodiments described previously and provided only by way of example. It includes various modifications, alternative forms and other variations that the person skilled in the art could contemplate in the scope of the present invention and, in particular, all combinations of different modes of operation described previously can be taken separately or in combination.

The invention claimed is:

1. An assembly for a seat frame, comprising a structural tube and at least one frame wire assembled on the structural tube, wherein the frame wire is assembled on the structural tube by metal forming without addition of external material, wherein the structural tube extends along a transverse axis and the frame wire comprises a longitudinal portion extending along a longitudinal axis substantially perpendicular to the transverse axis, wherein the frame wire comprises a loop-shaped portion connected to the longitudinal portion, wherein the loop-shaped portion comprises an inner surface substantially conforming to at least one part of a receiving surface of the structural tube, and wherein the inner surface comprises at least one rib able to cooperate with at least one complementary groove arranged on the receiving surface of the structural tube.

2. The assembly according to claim 1, in which the structural tube comprises at least one axial abutment, able to immobilize the frame wire in translation in relation to the structural tube.

3. The assembly according to claim 1, in which the structural tube comprises two axial abutments disposed on both sides of the receiving surface of the structural tube.

4. A seat frame for a backrest or a seat portion of a vehicle seat, comprising a left side flank and a right side flank, wherein the frame comprises at least one structural tube mounted to the left side flank and to the right side flank by metal forming without addition of external material, wherein the frame also comprises at least one assembly according to claim 1.

5. The seat frame according to claim 4, in which the frame wire of the assembly is mounted to the left side flank and to the right side flank by metal forming without addition of external material.

6. The seat frame according to claim 4, in which the frame wire of the assembly comprises a mating portion able to be connected to a headrest.

7. The seat frame according to claim 4, in which the assembly comprises a securing plate integral with the frame wire and substantially arranged opposite of the mating portion of the frame wire in relation to the structural tube of the assembly.

8. A seat for an automobile, comprising a seat frame according to claim 4.

9. The seat frame according to claim 4, wherein the frame wire of the assembly comprises a mating portion able to be removably received in at least one headrest recess.

10. A seat frame for a backrest or a seat portion of a vehicle seat, comprising a left side flank and a right side flank, wherein the frame comprises at least one structural tube mounted to the left side flank and to the right side flank by metal forming without the addition of external material, wherein the frame also comprises at least one frame wire assembled on the structural tube, wherein the frame wire is assembled on the structural tube by metal forming without addition of external material, wherein the frame wire comprises a mating portion able to be connected to a headrest, and wherein the mating portion of the frame wire comprises at least one notch able to ensure locking in translation, cooperating with at least one lock tab of the headrest.

11. A seat for an automobile, comprising a seat frame according to claim 10.

12. The seat frame according to claim 10, wherein the mating portion is able to be removably received in at least one headrest recess.

* * * * *